L. G. COPEMAN.
REFRIGERATING APPARATUS.
APPLICATION FILED FEB. 16, 1920.
1,396,996.
Patented Nov. 15, 1921.
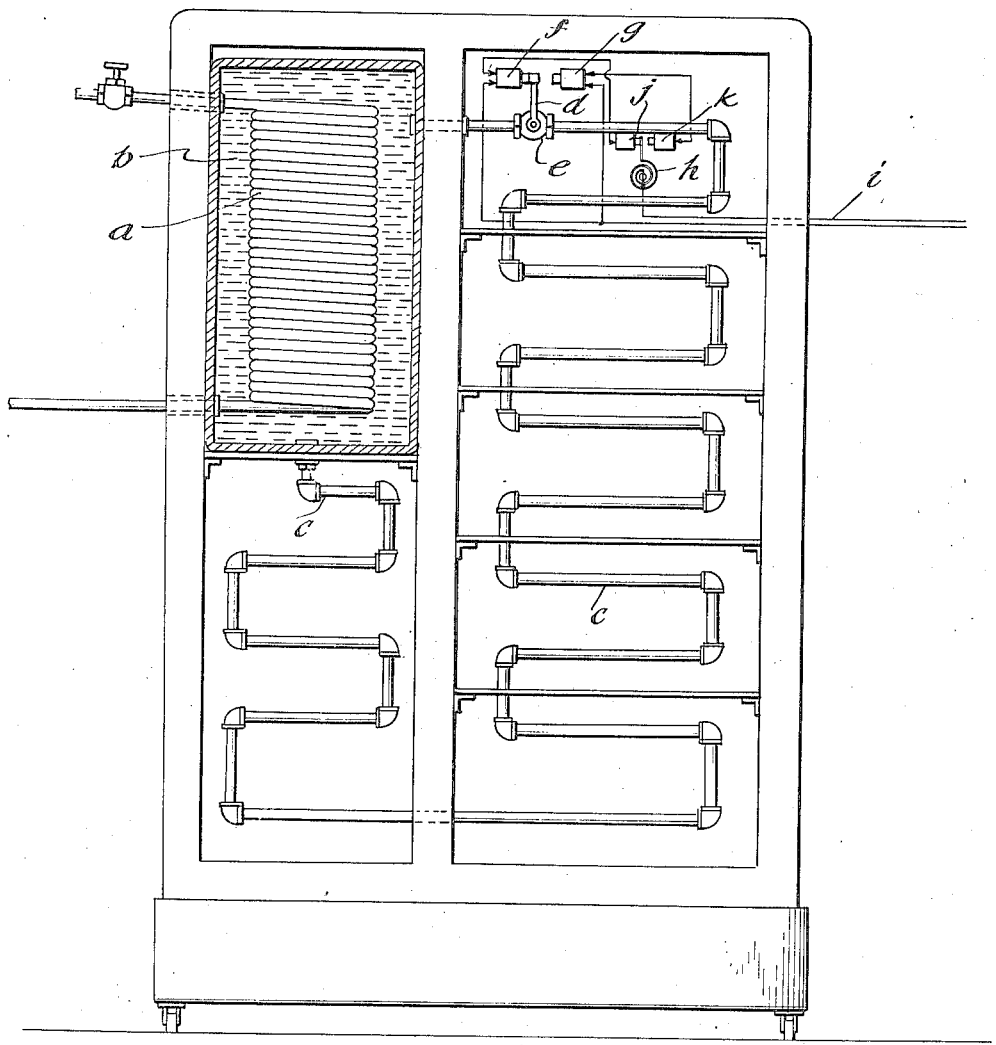
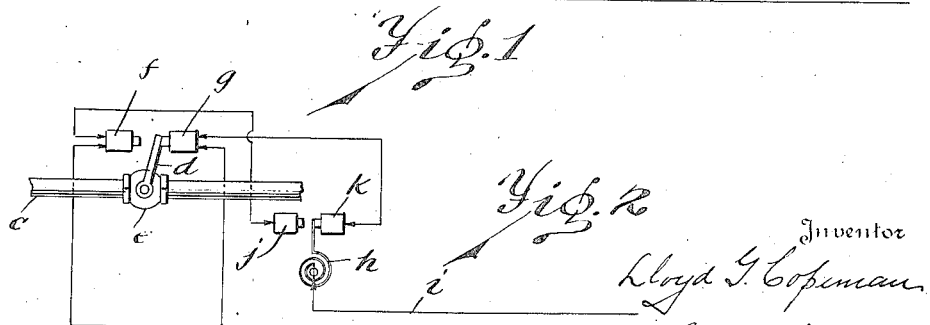
Inventor
Lloyd G. Copeman
By Stuart E. Barnes
Attorney

UNITED STATES PATENT OFFICE.

LLOYD GROFF COPEMAN, OF FLINT, MICHIGAN.

REFRIGERATING APPARATUS.

1,396,996.	Specification of Letters Patent.	Patented Nov. 15, 1921.

Application filed February 16, 1920. Serial No. 358,910.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigerating apparatus and has for its object a refrigerating apparatus in which a medium that can be given a temperature that is relatively low is contained in a storage chamber. Whenever the temperature in the food chamber falls below a predetermined degree, a thermostat automatically opens a valve and allows this refrigerating medium to circulate long enough in the food chamber to abstract a sufficient number of heat units to bring the chamber again to the desired temperature, whereupon the circulation of the cooling medium is then cut off until such time as it is again called into operation by reason of the rise in temperature in the food chamber.

The principle of operation is to utilize any suitable refrigerating mechanism to abstract the heat from the storage chamber so as to reduce the temperature of the medium contained in the storage chamber to a relatively low degree. This will more fully appear in the description following.

In the drawings,—

Figure 1 is a front elevation of a refrigerator equipped with my invention, the doors being omitted for clearness of illustration and the brine tank being shown in vertical cross section.

Fig. 2 is a diagrammatic view of the thermostat and the control valve for the brine circulating pipe.

*a* designates the refrigerating coil, which, as already explained, can be connected with any suitable mechanism for liquefying and expanding the gas to abstract heat from the surrounding medium. *b* is the brine tank containing brine, but obviously any other suitable medium or liquid which will stand a relatively low temperature without affecting its fluidity can be utilized. In the bottom of the brine tank a circulating pipe *c* leads down through the chamber below the brine tank, zig-zagging from one side to the other to provide the necessary length of exposure to accomplish the purpose. The pipe then crosses into the main food chamber where the same zig-zagging occurs until the top of the chamber is reached, whereupon the pipe returns to the top of the brine tank. There is, however, in the top run of the pipe a valve *e* adapted to be operated by the lever *d* to open and close the valve. This lever *d* is adapted to be attracted to the pole of either of the solenoids *f* and *g* depending upon which one is energized. *h* is a thermostat in circuit with the wire *i* and which is adapted to act as a switch in connection with the switch points *j* and *k*. For instance, with the thermostat in the position shown in Fig. 1, the solenoid *f* is energized to attract the valve lever *d*. With the thermostat in the position shown in Fig. 2, the solenoid *g* is energized to attract the valve lever *d* and thereby turn the valve in the opposite direction.

It will be evident that the thermostat can be so made that when the temperature in the food chamber falls to a given degree the thermostat must shift from one switch point to the other, thereby energizing one of the magnets to open the valve *e* and allow the brine to circulate through the pipe *c*. This it does in accordance with the so-called thermo-siphon system wherein the warm fluid will rise to the top and the cold fluid will drop to the bottom and keep this up to establish a continuous flow. When the desired degree of temperature is again obtained in the food chamber, the thermostat switch again shifts to the opposite switch point to energize the opposite solenoid and close the valve *e*.

It will be obvious that the special character of the thermostat does not affect the invention broadly. In fact, the valve might be operated directly by a suitable thermostat instead of interposing an electric switch.

What I claim is:

1. In a refrigerating system, the combination of a chamber containing a fluid calculated to withstand a relatively low temperature, an expanding chamber for abstracting heat therefrom to reduce the temperature of said fluid to a relatively low point, a food chamber in proximity, a pipe line circulating said fluid through said food chamber by thermally-induced currents and automatic means for controlling the circulation of said fluid through the food chamber in accordance with thermal conditions in the food chamber.

2. In a refrigerating system, the combination of a chamber containing a fluid adapted to withstand a relatively low temperature, mechanically operated means contained in part therein for reducing the temperature of said fluid to a relatively low degree, a food chamber in proximity therewith, a pipe line circulating by thermal influences said fluid through the food chamber and again delivering it to the fluid chamber, a valve for controlling the flow through said pipe, and automatic means for regulating said valve in accordance with the thermal changes in the food chamber 3. In a refrigerating system, the combination of a chamber containing a fluid calculated to withstand a relatively low temperature, an expanding chamber for abstracting heat therefrom to reduce the temperature of said fluid to a relatively low point, a food chamber in proximity, a pipe line circulating said fluid through said food chamber by thermally-induced currents, a valve in said pipe line for cutting off the circulation therein, means for opening and closing said valve, and a thermostat in position to be influenced by the temperature in the food chamber to control said valve opening and closing means In testimony whereof I affix my signature.

LLOYD GROFF COPEMAN.